US005305245A

United States Patent [19]

Kurihara

[11] Patent Number: 5,305,245
[45] Date of Patent: Apr. 19, 1994

[54] DIGITAL CORRELATING DEVICE
[75] Inventor: Takao Kurihara, Tokyo, Japan
[73] Assignee: Clarion Co., Ltd., Tokyo, Japan
[21] Appl. No.: 973,254
[22] Filed: Nov. 9, 1992
[30] Foreign Application Priority Data
  Nov. 20, 1991 [JP] Japan .................... 3-332633
[51] Int. Cl.$^5$ .................. G06F 15/336; G06F 1/02
[52] U.S. Cl. ..................... 364/728.03; 364/717
[58] Field of Search ............ 364/728.03, 717; 375/1
[56]     References Cited
     U.S. PATENT DOCUMENTS
  4,510,579  4/1985  Nossen .................. 364/715.11
  4,845,726  7/1989  Kurihara et al. .
  5,062,121 10/1991  Kurihara et al. ............ 375/1
  5,126,959  6/1992  Kurihara et al. .

Primary Examiner—Tan V. Mai
Attorney, Agent, or Firm—Flynn, Thiel, Boutell & Tanis

[57]      ABSTRACT

A device for making it possible to set reference data in a digital correlator with a high speed includes a digital correlator, a PN (pseudo-noise) code generator and a counter. The reference data outputted by the PN code generator are inputted to the digital correlator by reference register clocks. At the same time, these clocks are counted by the counter and when this count value arrives at a number of chips of the reference data, input of the reference data is terminated.

4 Claims, 7 Drawing Sheets

PRIOR ART

DIGITAL CORRELATING DEVICE

FIELD OF THE INVENTION

The present invention relates to an improvement of a digital correlating device suitable for a spread spectrum communication (hereinbelow abbreviated to SSC) device, etc.

BACKGROUND OF THE INVENTION

Figure 7:
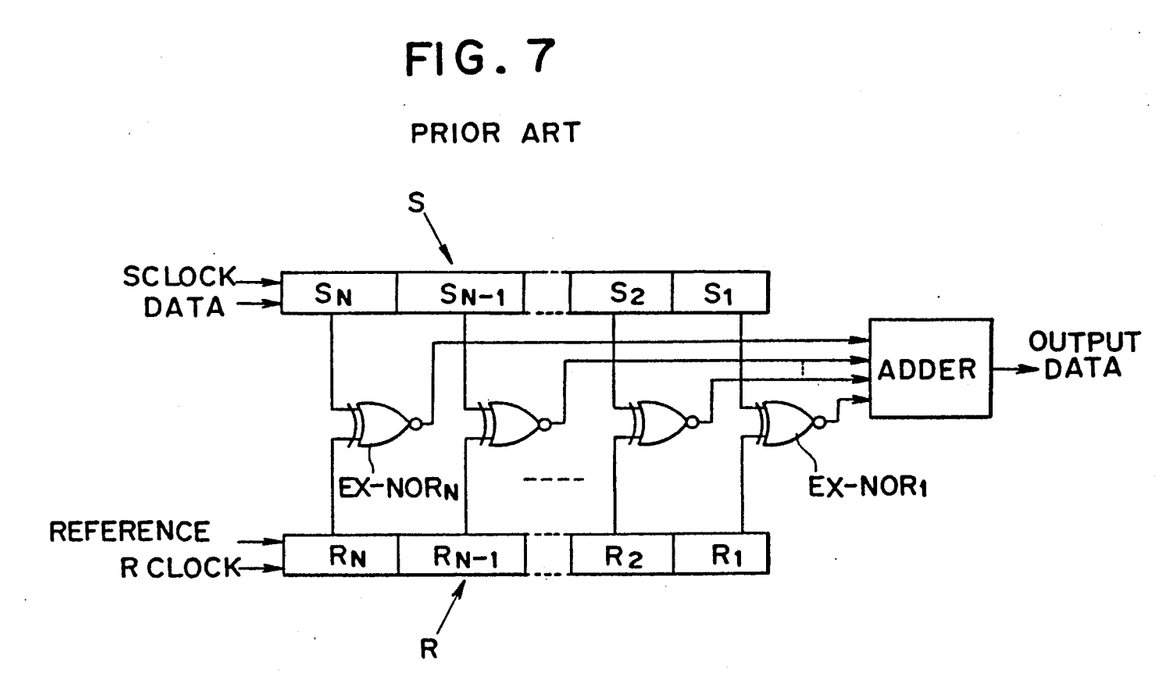
FIG. 7 is a block diagram indicating the construction of a prior art digital correlator.

FIG. 7 shows a basic circuit construction of a prior art digital correlator.

In the figure, R and S represent N bit shift registers; Ex-$NOR_1$~$NOR_N$ exclusive NOR gates; and ADDER an adder. The N bit register R is loaded in serial with N bit reference data REFERENCE in synchronism with a clock RCLOCK. On the other hand, the N bit register S is loaded in serial with information data DATA in synchronism with another clock SCLOCK. It is detected by the Ex-$NOR_1$~$NOR_N$ gates whether the contents of the registers are in accordance or not in accordance with each other for every bit and the total number of bits, which are in accordance with each other, is obtained by the adder ADDER.

Figure 8:
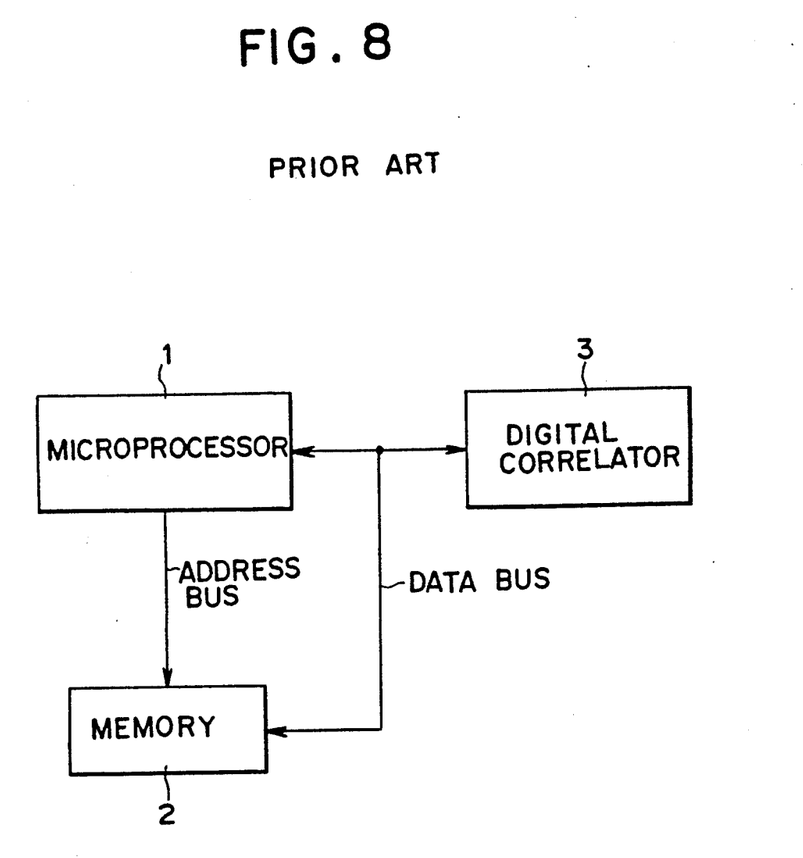
FIG. 8 is a block diagram indicating a prior art method for setting reference data in the digital correlator indicated in FIG. 7.

In the case where the digital correlator as indicated in FIG. 7 is used in SSC, it is necessary to set previously reference data by means of external circuits, e.g. a microprocessor 1 and a memory 2, as indicated in FIG. 8.

However, in the case where reference data are changed frequently, or in the case where the reference data are very long, etc., inconveniences such as elongation of the time necessary for changing the reference data, lowering in utilization efficiency of the microprocessor 1 and the memory 2, etc. are produced.

OBJECT OF THE INVENTION

The object of the present invention is to provide a digital correlating device of circuit type, by which reference data can be set in a digital correlator with a high speed.

SUMMARY OF THE INVENTION

In order to achieve the above object, a digital correlating device according to the present invention is characterized in that it comprises a PN code generator, to which a PN code clock is inputted and which generates reference data at setting of initial information and input of a strobe signal; a counter, which counts reference register clocks at input of a load signal to output a count value; a digital correlator, to which the reference data are inputted at input of the reference register clocks; and a control circuit, which supplies the strobe pulse to the PN code generator, supplies the load signal to the counter, supplies the PN code clock to the PN code generator, supplies the reference register clocks to the digital correlator, and controls the PN code clock, the reference register clocks and the counter, based on the counter output.

In this way, the reference data for the digital correlator are set, while the PN code clock for the PN code generator and the reference register clocks for the digital correlator are controlled by the control circuit and the counter.

DETAILED DESCRIPTION

Hereinbelow the embodiment of the present invention indicated in the drawings will be explained.

Figure 1:
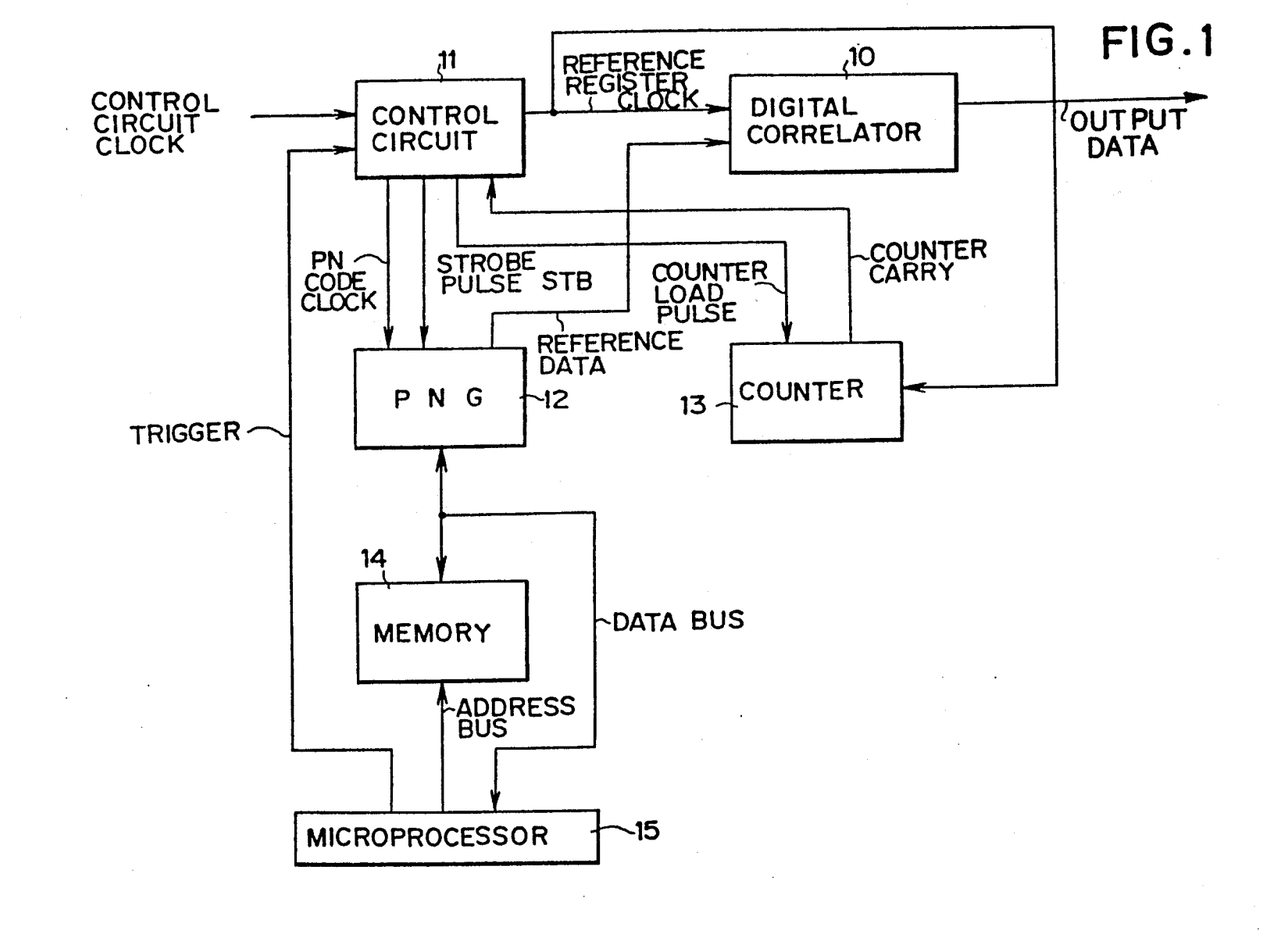
FIG. 1 is a block diagram indicating the construction of a digital correlating device according to an embodiment of the present invention.

FIG. 1 is a block diagram for explaining the embodiment of the digital correlating device according to the present invention, in which reference numeral 10 is a digital correlator e.g. as indicated in FIG. 7; 11 is a control circuit; 12 is a PN code generator (PNG); 13 is a counter; 14 is a memory; and 15 is a microprocessor.

Figure 2:
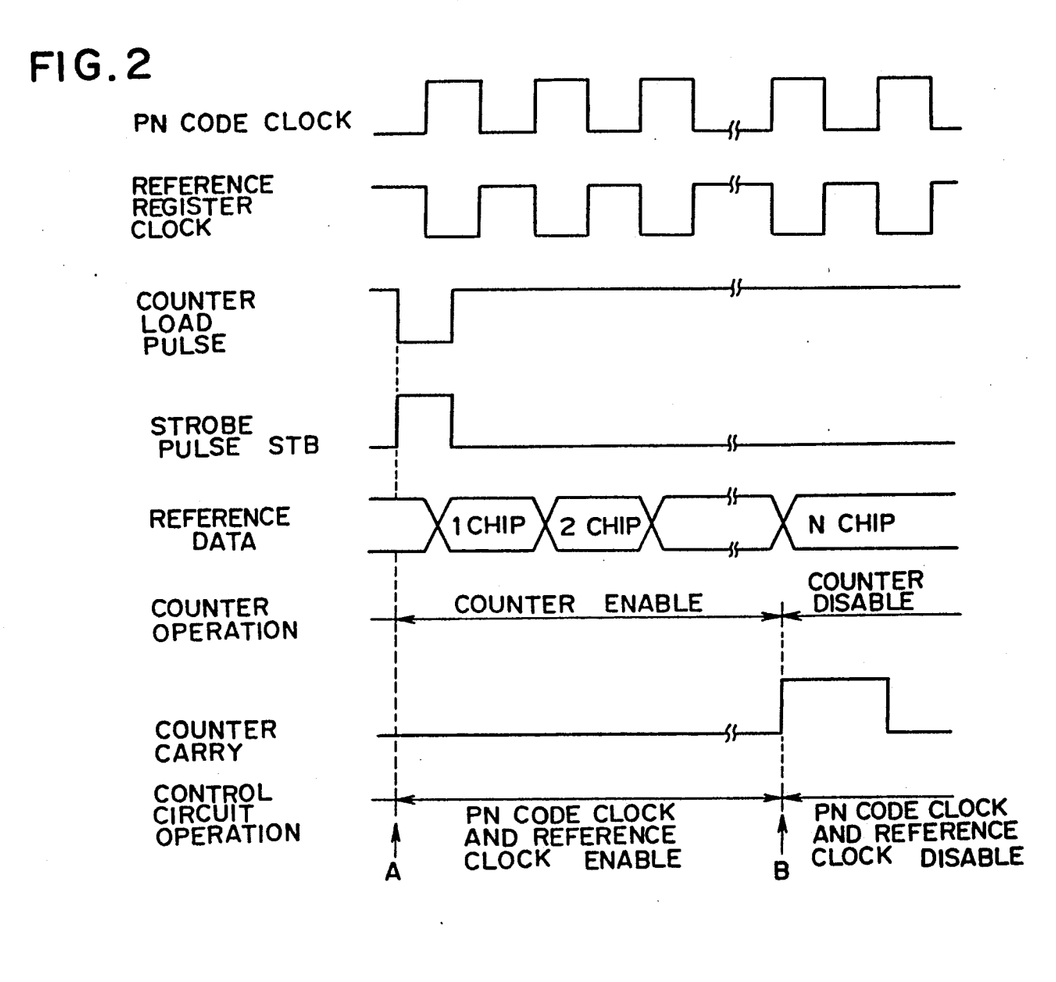
FIG. 2 is a timing chart for explaining the operation of the embodiment.

FIG. 2 is a timing chart for explaining the operation of the device indicated in FIG. 1.

The microprocessor 15 sets initial information necessary for generating a PN code in the PNG 12 from the memory 14 to output a control circuit starting signal trigger to the control circuit 11.

The control circuit 11 outputs a strobe pulse STB and a counter load pulse to the PNG 12 and the counter 13, respectively, at receiving the trigger. A PN code clock and a reference register clock are put in an enable state by the control circuit 11 with output timing of the strobe pulse STB and the counter load pulse and outputted to the PNG 12 and the counter 13, respectively (at A in FIG. 2).

Reference data generated by the PNG 12 are inputted successively to the reference register in the digital correlator 10 by the reference register clocks. Parallelly thereto, the counter 13 counts reference register clocks and when the count value arrives at a number N of chips of the reference data, it outputs a carry to the control circuit 11.

The control circuit 11 puts the PN code clock, the reference register clocks and the counter in a disable state with output timing of the carry (at B in FIG. 2). As the result, setting of the reference data in the digital correlator 10 is terminated.

Figure 3:
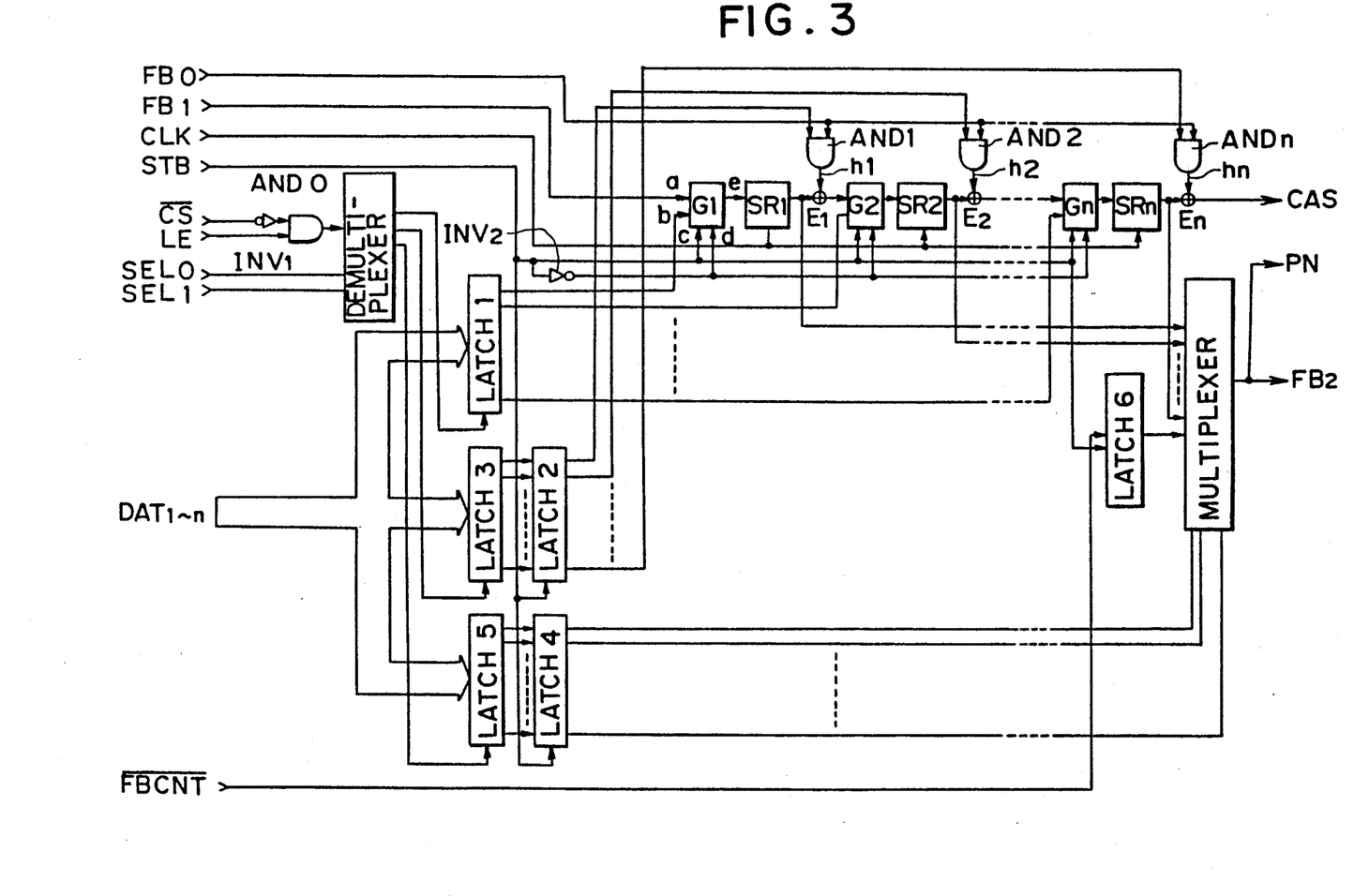
FIG. 3 is a block diagram of an example of the construction of a PN code generator.
Figure 4:
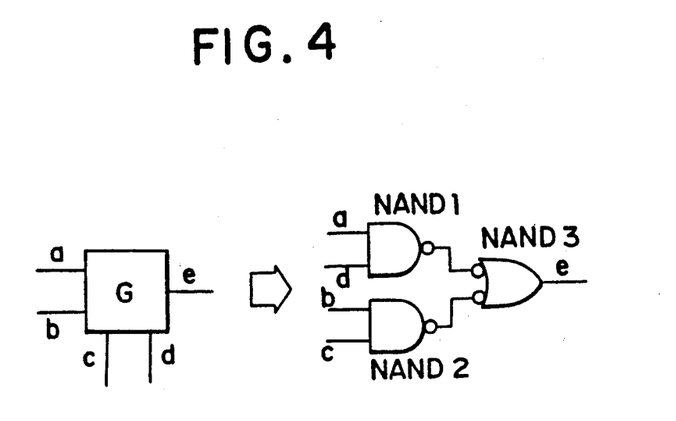
FIG. 4 is a block diagram of an example of the construction of a steering gate.

FIG. 3 shows a PNG having a construction, which can be used both alone and in a cascade connection In FIG. 3, $G_1$ to $G_N$ represent steering gate circuits, each of which can be constructed e.g. by using NAND gates $NAND_1$, $NAND_2$ and $NAND_3$ as indicated in FIG. 4.

$L_1$ to $L_6$ are latch circuits; $AND_0$ to $AND_N$ are AND circuits; $INV_1$ and $INV_2$ are inverters; $SR_1$ to $SR_2$ are flipflops; $E_1$ to $E_N$ are exclusive logic sum gates; MPX is a multiplexer; and DE-MPX is a demultiplexer.

Following three sorts of initial information (i) to (iii) are necessary for code generation by the PN code generating device PNG as indicated in FIG. 3;
(i) initial state of the flipflops $SR_1$ to $SR_N$,
(ii) feedback state, and
(iii) last stage selection state for the flipflops.

In FIG. 3, CLK is a PN code clock; STB is a PN code switching strobe signal; $\overline{CS}$ is a chip select signal; LE is a latch enable signal; $DAT_1$ to $DAT_N$ are DATA (i) to (iii) described above; $SEL_0$ to $SEL_1$ are data select signals, which select data as indicated in TABLE 1.

TABLE 1

| SEL 1 | SEL 0 | DATA |
|---|---|---|
| L | L | (i) |
| L | H | (ii) |
| H | L | (iii) |
| H | H | Meaningless |

$FB_0$ to $FB_1$ and CAS represent input and output terminals for the cascade connection; $FB_2$ a three-state output; and PN a PN code output.

Figure 5:
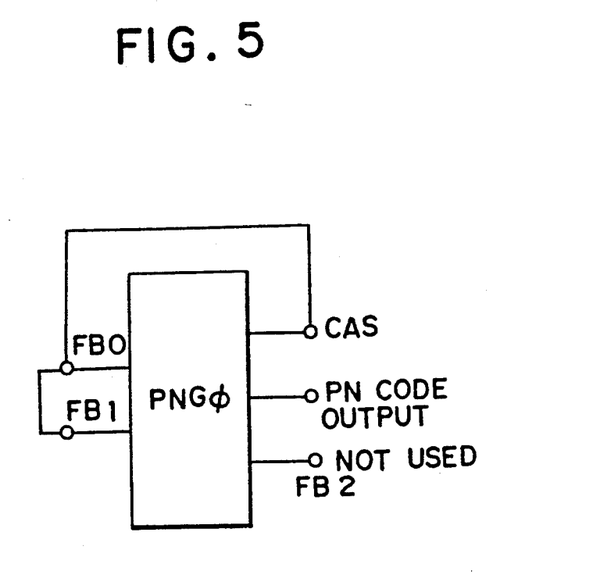
FIG. 5 is a diagram indicating the connection of the PN code generator, when it is used alone.

FIG. 5 shows a connection diagram, in the case where the PNG indicated in FIG. 3 is used alone.

Figure 6:
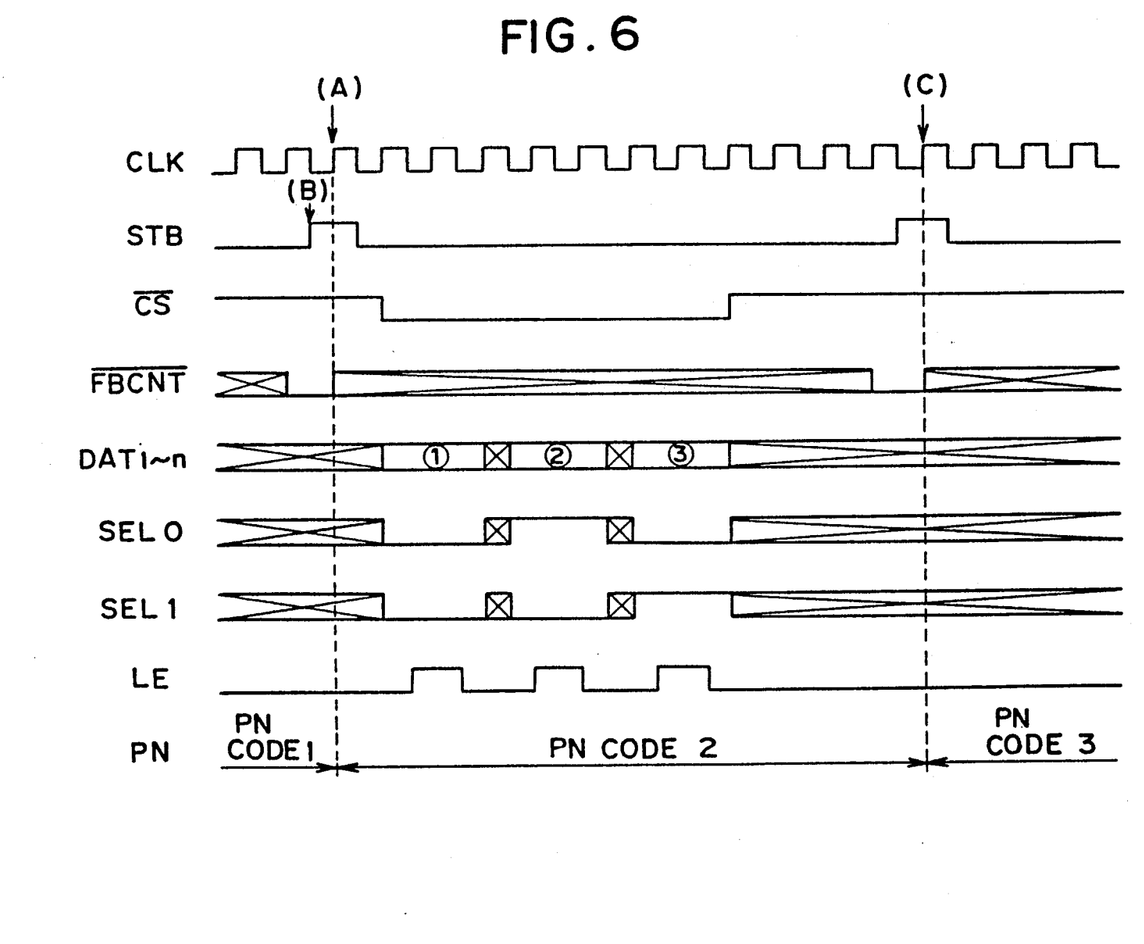
FIG. 6 is a timing chart for explaining the operation of the PN code generator.

The operation of the circuit indicated in FIG. 5 will be explained by using the timing chart indicated in FIG. 6 and the marks used in FIG. 3.

Now it is supposed that PN code 1 is outputted from the PN code output terminal PN. When the strobe pulse STB is inputted (B), the circuit works as follows.

(a) The content of a latch $L_1$ is set at the date inputs of the flipflops $SR_1$ to $SR_N$ through the steering gate. These data appear at the outputs of the flipflops $SR_1$ to $SR_N$ by the rising edge (A) of a clock pulse CLK.

The content of the latch $L_1$ represents the initial state of the flipflops $SR_1$ to $SR_N$.

(b) The content of the latch $L_3$ is outputted from the latch $L_2$ and it is controlled to which exclusive logic sum gate a feedback input signal from $FB_0$ should be fed back through the AND gates $AND_1$ to $AND_N$. Further, when the content of the latch $L_5$ outputted from the latch $L_4$ and the latch $L_6$ puts the multiplexer is an enable state by inputting a feedback control $\overline{FBCNT}$ and a strobe pulse STB, the outputs of the flipflops $SR_1$ to $SR_N$, selected so as to correspond to the output of the latch $L_4$, are outputted as a feedback signal.

Here it is supposed that the multiplexer is in the enable state, when the output of the latch $L_6$ is "L", and in the disable state, when it is "H".

Further the content of the latch $L_3$ indicates the feedback state and the content of the latch $L_5$ represents the last stage selection state of the flipflops $SR_1$ to $SR_N$.

(c) As the result of (a) and (b), a new PN code 2 is outputted from the PN code output terminal PN by a clock pulse CLK after (A).

That is, the PN code 1 is switched-over to the PN code 2.

(d) On the other hand, the strobe pulse STB is used also as an offering pulse into an external control circuit such as a microprocessor, etc. and the external control circuit such as a microprocessor, etc. prepares generation of the next PN code 3 by using this offering pulse as a trigger.

That is, "L" is inputted to the chip select $\overline{CS}$ and a latch enable pulse LE is inputted to the demultiplexer through the AND gate $AND_0$ so as to enable the corresponding latches $L_1$, $L_3$ and $L_5$ one after another by the control signals $SEL_0$ to $SEL_1$ of the demultiplexer.

At this time, the data sets $DAT_1$ to $DAT_N$ (i) to (iii) described above are latched one after another by the latches $L_1$, $L_3$ and $L_5$ so that the preparation for the generation of the PN code 3 is terminated.

Thereafter, when a strobe pulse STB is inputted again, the operations (a) to (c) described above are repeated and a new PN code 3 is outputted from the PN code output terminal PN by a clock pulse CLK after (c).

As explained above, according to the present invention, compared with a case where reference data are set in the digital correlator only by means of a memory system by a microprocessor as by the prior art technique, since the microprocessor, etc. set only initial information necessary for generating the reference data in the PNG and all the processing thereafter is effected by the control circuit, it is possible to shorten reference data switching time and to improve utilization efficiency of the microprocessor and the memory.

What is claimed is:

1. A digital correlating device comprising:
a PN code generator, to which a PN code clock is inputted and which generates reference data after setting of initial information and input of a strobe signal;
a counter, which counts reference register clocks after input of a load signal to output a count value;
a digital correlator, to which said reference data are inputted in response to said reference register clocks, said digital correlator producing a correlation output; and
a control circuit, which supplies said strobe signal to said PN code generator, supplies said load signal to said counter, supplies said PN code clock to said PN code generator, supplies said reference register clocks to said digital correlator, and which controls said PN code clock, said reference register clocks and said counter based on the counter output.

2. A digital correlating device comprising:
a PN code generator, to which a PN code clock is inputted and which generates reference data after setting of initial information and input of a strobe signal;
a counter, which counts reference register clocks after input of a load signal to output a count value;
a digital correlator, to which said reference data are inputted in response to said reference register clocks, said digital correlator producing a correlation output; and
a control circuit, which supplies said strobe signal to said PN code generator, supplies said load signal to said counter, supplies said PN code clock to said PN code generator supplies said reference register clocks to said digital correlator, and controls said digital correlator based on the counter output, when said count value arrives at a number of chips of the reference data, so as to put said PN code clock, said reference register and said counter clocks in a disable state so that setting of said reference data in said digital correlator is terminated.

3. A digital correlating device according to claim 1, wherein said PN code generator includes a plurality of flipflops and initial information for generating said reference data is set by controlling an initial state of the flipflops.

4. A digital correlating device comprising:

a PN code generator for generating reference data in response to setting of initial information;

a counter, which counts reference register clocks to output a count value;

a digital correlator, to which said reference data are inputted in response to input of said reference register clocks, said digital correlator producing a correlation output; and a control circuit, which controls generation of said reference data by said PN code generator, supplies said reference register clocks to said digital correlator, and controls said digital correlator, based on the counter output, when said count value arrives at a number of chips of the reference data, so as to put said PN code clock, said reference register clocks and said counter in a disable state so that setting of said reference data in said digital correlator is terminated.

* * * * *

UNITED STATES PATENT AND TRADEMARK OFFICE
CERTIFICATE OF CORRECTION

PATENT NO. : 5 305 245
DATED : April 19, 1994
INVENTOR(S) : Takao KURIHARA It is certified that error appears in the above-identified patent and that said Letters Patent is hereby corrected as shown below:

Column 6, between lines 9 and 10; please insert:
    ---5. A digital correlating device according to Claim 2, wherein said PN code generator includes a plurality of flipflops and initial information for generating said reference data is set by controlling an initial state of the flipflops.---.

Column 4, line 55; after "generator" insert ---,---.

Signed and Sealed this

Second Day of August, 1994

*Attest:*

BRUCE LEHMAN

*Attesting Officer*     Commissioner of Patents and Trademarks